United States Patent
Yang et al.

(10) Patent No.: US 10,674,400 B2
(45) Date of Patent: Jun. 2, 2020

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Suckchel Yang, Seoul (KR); Seungmin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 13 days.

(21) Appl. No.: 16/060,280

(22) PCT Filed: Dec. 12, 2016

(86) PCT No.: PCT/KR2016/014544
§ 371 (c)(1),
(2) Date: Jun. 7, 2018

(87) PCT Pub. No.: WO2017/099553
PCT Pub. Date: Jun. 15, 2017

(65) Prior Publication Data
US 2018/0376371 A1    Dec. 27, 2018

Related U.S. Application Data

(60) Provisional application No. 62/265,433, filed on Dec. 10, 2015.

(51) Int. Cl.
*H04W 28/06* (2009.01)
*H04L 5/14* (2006.01)
(Continued)

(52) U.S. Cl.
CPC ......... *H04W 28/065* (2013.01); *H04L 1/1812* (2013.01); *H04L 5/001* (2013.01);
(Continued)

(58) Field of Classification Search
CPC ............... H04W 28/065; H04W 72/0446; H04L 5/001; H04L 1/1812
See application file for complete search history.

(56) References Cited

U.S. PATENT DOCUMENTS

| 2013/0044651 A1 | 2/2013 | Wang et al. |
| 2013/0301503 A1* | 11/2013 | Park ............... H04W 72/0406 370/311 |

(Continued)

FOREIGN PATENT DOCUMENTS

| EP | 2806590 A1 | 11/2014 |
| WO | 2013105838 A1 | 7/2013 |
| WO | 2015069054 A1 | 5/2015 |

*Primary Examiner* — Yemane Mesfin
*Assistant Examiner* — Henry Baron
(74) *Attorney, Agent, or Firm* — Dentons US LLP

(57) ABSTRACT

The present invention relates to a wireless communication system. Particularly, the present invention relates to a method for performing communication by a terminal in a TDD-based wireless communication system, and an apparatus therefor. The method comprises the steps of: configuring a PCell and an SCell, wherein the PCell and the SCell have different UL-DL configurations from each other; receiving information indicating a reference UL-DL configuration; and performing a signal processing operation according to a transmission direction indicated by the reference UL-DL configuration, in only a cell having the same transmission direction as the transmission direction indicated by the reference UL-DL configuration from among the PCell and the SCell, as for subframe # k1 in which transmission directions of the PCell and the SCell are different from each other.

10 Claims, 12 Drawing Sheets

| | | | | | | | | | | |
|---|---|---|---|---|---|---|---|---|---|---|
| UD-cfg #1 (PCell) | D | S | U | U | D | D | S | U | U | D |
| UD-cfg #3 (SCell) | D | S | U | U | U | D | D | D | D | D |

| | | | | | | | | | | |
|---|---|---|---|---|---|---|---|---|---|---|
| UD-cfg #0 | D | S | U | U | U | D | S | U | U | U |
| UD-cfg #1 (R-cfg) | D | S | U | U | D | D | S | U | U | D |
| UD-cfg #2 | D | S | U | D | D | D | S | U | D | D |
| UD-cfg #3 (R-cfg) | D | S | U | U | U | D | D | D | D | D |
| UD-cfg #4 (R-cfg) | D | S | U | U | D | D | D | D | D | D |
| UD-cfg #5 | D | S | U | D | D | D | D | D | D | D |
| UD-cfg #6 (R-cfg) | D | S | U | U | U | D | S | U | U | D |

(51) Int. Cl.
*H04L 1/18* (2006.01)
*H04W 72/04* (2009.01)
*H04L 5/00* (2006.01)
*H04L 27/26* (2006.01)

(52) U.S. Cl.
CPC .......... *H04L 5/0073* (2013.01); *H04L 5/0092* (2013.01); *H04L 5/14* (2013.01); *H04L 5/1469* (2013.01); *H04L 27/26* (2013.01); *H04W 72/0406* (2013.01); *H04W 72/0446* (2013.01)

(56) References Cited

U.S. PATENT DOCUMENTS

| | | |
|---|---|---|
| 2014/0133369 A1 | 5/2014 | Cheng et al. |
| 2014/0198752 A1* | 7/2014 | Hsieh ................ H04W 72/0446 370/329 |
| 2014/0301255 A1 | 10/2014 | Yin et al. |
| 2015/0245246 A1 | 8/2015 | Golitschek Edler Von Elbwart |

* cited by examiner

PUCCH format 1a and 1b structure (normal CP case)

PUCCH format 1a and 1b structure (extended CP case)

FIG. 10

| SF index | 0 | 1 | 2 | 3 | 4 | 5 | 6 | 7 | 8 | 9 |
|---|---|---|---|---|---|---|---|---|---|---|
| PCC (Cfg 0) | D | S | U | U | U | D | S | U | U | U |
| SCC (Cfg 2) | D | S | U | D | D | D | S | U | D | D |

⇩

| PCC | D | S | U | U | U | D | S | U | U | U |
|---|---|---|---|---|---|---|---|---|---|---|
| SCC | D | S | U | X | X | D | S | U | X | X |

FIG. 11

| UD-cfg #1 (PCell) | D | S | U | U | D | D | S | U | U | D |
|---|---|---|---|---|---|---|---|---|---|---|
| UD-cfg #3 (SCell) | D | S | U | U | U | D | D | D | D | D |

| UD-cfg #0 | D | S | U | U | U | D | S | U | U | U |
|---|---|---|---|---|---|---|---|---|---|---|
| UD-cfg #1 (R-cfg) | D | S | U | U | D | D | S | U | U | D |
| UD-cfg #2 | D | S | U | D | D | D | S | U | D | D |
| UD-cfg #3 (R-cfg) | D | S | U | U | U | D | D | D | D | D |
| UD-cfg #4 (R-cfg) | D | S | U | U | D | D | D | D | D | D |
| UD-cfg #5 | D | S | U | D | D | D | D | D | D | D |
| UD-cfg #6 (R-cfg) | D | S | U | U | U | D | S | U | U | D |

FIG. 12

| UD-cfg #4 (R-cfg) | D | S | U | U | D | D | D | D | D | D |
|---|---|---|---|---|---|---|---|---|---|---|

| UD-cfg #1 (PCell) | D | S | U | U | D | D | S(d) | N | N | D |
|---|---|---|---|---|---|---|---|---|---|---|
| UD-cfg #3 (SCell) | D | S | U | U | N | D | D | D | D | D |

| UD-cfg #1 (PCell) | D | S | U | U | N | D | N | N | N | D |
|---|---|---|---|---|---|---|---|---|---|---|
| UD-cfg #3 (SCell) | D | S | U | U | N | D | N | N | N | D |

(a) Alt 1

| UD-cfg #1 (PCell) | D | S | U | U | N | D | S(u) | U | U | D |
|---|---|---|---|---|---|---|---|---|---|---|
| UD-cfg #3 (SCell) | D | S | U | U | U | D | N | N | N | D |

(b) Alt 2

| UD-cfg #1 (PCell) | D | S | U | U | D | D | S | U | U | D |
|---|---|---|---|---|---|---|---|---|---|---|
| UD-cfg #3 (SCell) | D | S | U | U | N | D | N | N | N | D |

(c) Alt 3

METHOD AND APPARATUS FOR TRANSMITTING AND RECEIVING SIGNAL IN WIRELESS COMMUNICATION SYSTEM

This application is a National Stage Application of International Application No. PCT/KR2016/014544, filed on Dec. 12, 2016, which claims the benefit of U.S. Provisional Application No. 62/265,433, filed on Dec. 10, 2015, all of which are hereby incorporated by reference in their entirety for all purposes as if fully set forth herein.

TECHNICAL FIELD

The present invention relates to a wireless communication system and, more specifically, to a method and apparatus for transmitting/receiving signals. The wireless communication system can support carrier aggregation.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE OF THE INVENTION

Technical Task

An object of the present invention devised to solve the problem lies in a method for efficiently transmitting/receiving signals in a wireless communication system and an apparatus for the same.

The technical problems solved by the present invention are not limited to the above technical problems and those skilled in the art may understand other technical problems from the following description.

Technical Solution

To achieve these and other advantages and in accordance with the purpose of the present invention, as embodied and broadly described, according to one embodiment, a method of performing communication, which is performed by a user equipment (UE) in a TDD (time division duplex)-based wireless communication system, includes the steps of configuring a PCell (primary cell) and an SCell (secondary cell), wherein the PCell and the SCell have a different UL (uplink)-DL (downlink) configuration, receiving information indicating a reference UL-DL configuration, and performing a signal processing operation according to a transmission direction based on the reference UL-DL configuration only in a cell having a transmission direction identical to the transmission direction based on the reference UL-DL configuration among the PCell and the SCell, as for a subframe # k1 where a transmission direction of the PCell is different from a transmission direction of the SCell.

To further achieve these and other advantages and in accordance with the purpose of the present invention, according to a different embodiment, a user equipment (UE) using a TDD (time division duplex)-based wireless communication system includes an RF (radio frequency) unit and a processor, the processor configured to configure a PCell (primary cell) and an SCell (secondary cell), wherein the PCell and the SCell have a different UL (uplink)-DL (downlink) configuration, the processor configured to receive information indicating a reference UL-DL configuration, the processor configured to perform a signal processing operation according to a transmission direction based on the reference UL-DL configuration only in a cell having a transmission direction identical to the transmission direction based on the reference UL-DL configuration among the PCell and the SCell, as for a subframe # k1 where a transmission direction of the PCell is different from a transmission direction of the SCell.

Preferably, a subframe configuration according to a UL-DL configuration is given by a table described in the following:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In this case, D denotes a downlink subframe, U denotes an uplink subframe, and S denotes a special subframe.

Preferably, the method can further include performing a signal processing operation according to a transmission direction of a subframe # k2 in the PCell and the SCell, as for the subframe # k2 where the transmission direction of the PCell is identical to the transmission direction of the SCell.

Preferably, a subframe configuration according to the reference UL-DL configuration may be identical to the transmission direction of the PCell and the SCell in all subframes where the transmission direction of the PCell is identical to the transmission direction of the SCell.

Preferably, the reference UL-DL configuration may be different from a UL-DL configuration set to the PCell. And, the reference UL-DL configuration may be different from a UL-DL configuration set to the PCell and a UL-DL configuration set to the SCell.

Preferably, information indicating the UL-DL configuration of the PCell and the UL-DL configuration of the SCell is received via system information and the information indicating the reference UL-DL configuration can be received via a PDCCH (physical downlink control channel.

Advantageous Effects

According to the present invention, it is possible to efficiently transmit/receive signals in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 10 illustrates half duplex (HD) type TDD based carrier aggregation;

FIGS. 11 to 13 illustrate a method of configuring a subframe and a method of transmitting and receiving a signal of a UE according to an embodiment of the present invention.

FIG. 14 illustrates a BS and a UE applicable to the present invention.

BEST MODE

Mode for Invention

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE. While the following description is given, centering on 3GPP LTE/LTE-A for clarity, this is purely exemplary and thus should not be construed as limiting the present invention.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
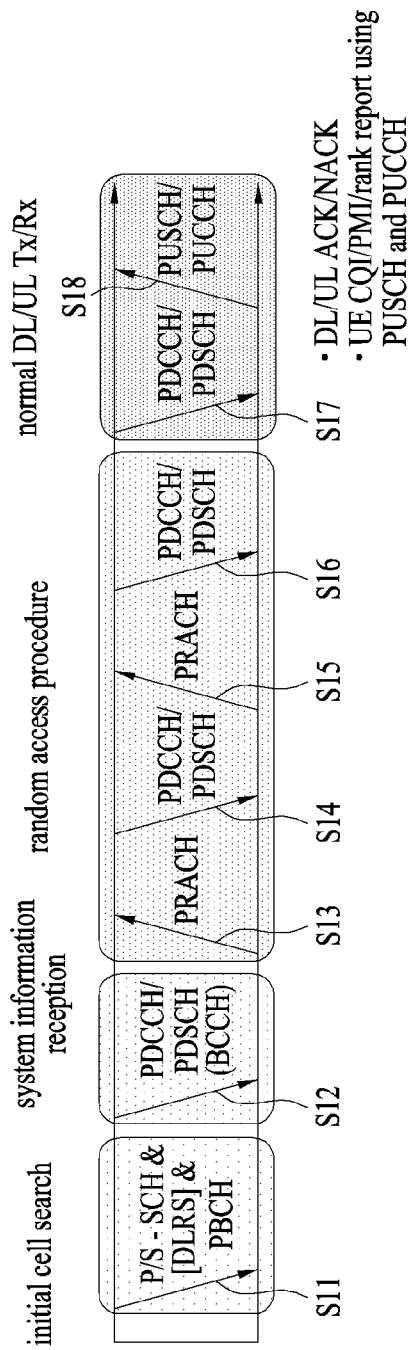
FIG. 1 illustrates physical channels used in a 3GPP LTE system as an exemplary wireless communication system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
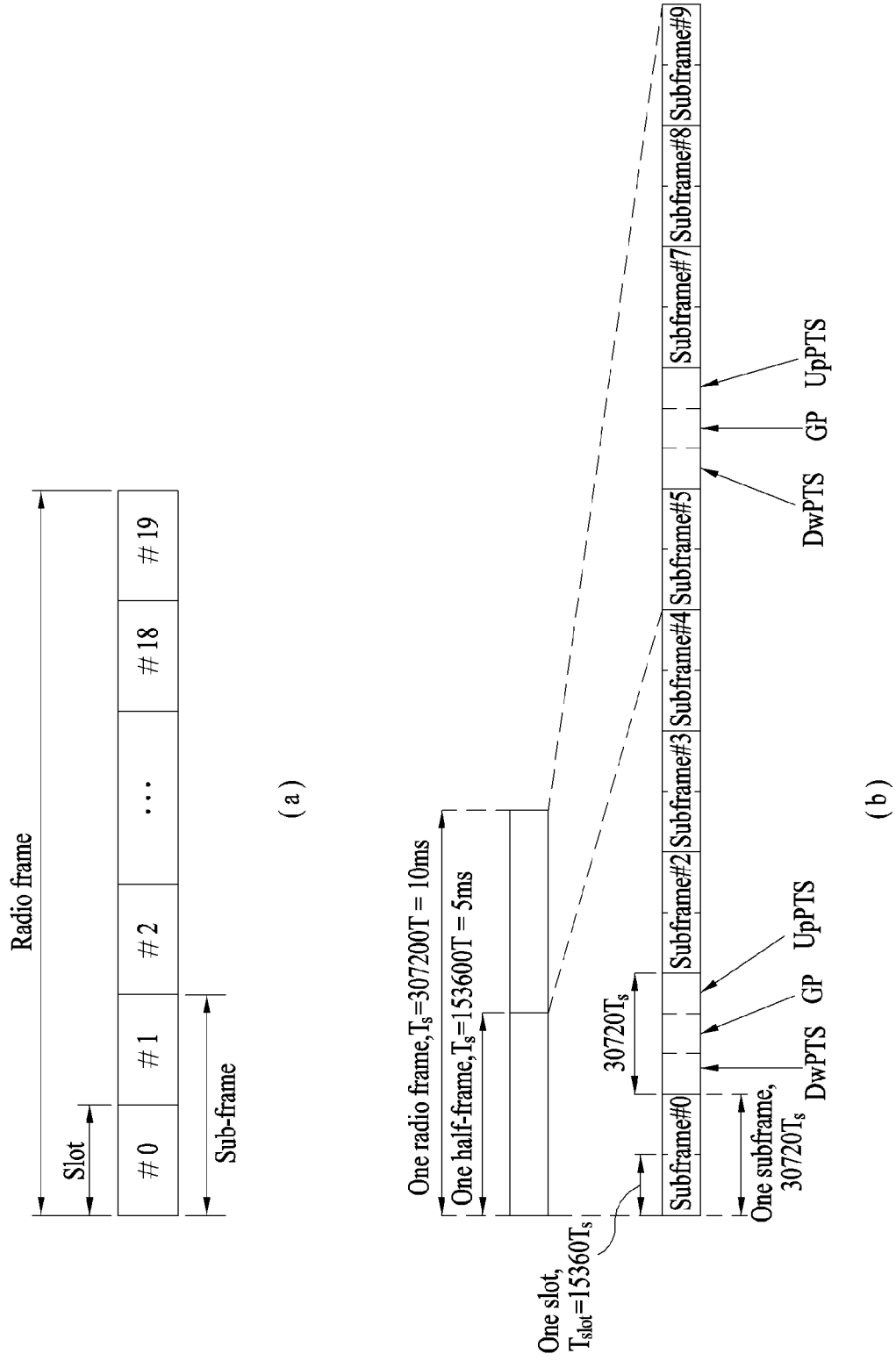
FIG. 2 illustrates a radio frame structure.

FIG. 2 illustrates a radio frame structure. In a cellular OFDM wireless packet communication system, uplink/downlink data packet transmission is performed on a sub-frame-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 1(0) special subframe. Normal subframes are used for an uplink or a downlink according to UL-DL configuration. A subframe includes 2 slots.

Table 1 shows subframe configurations in a radio frame according to UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE. UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
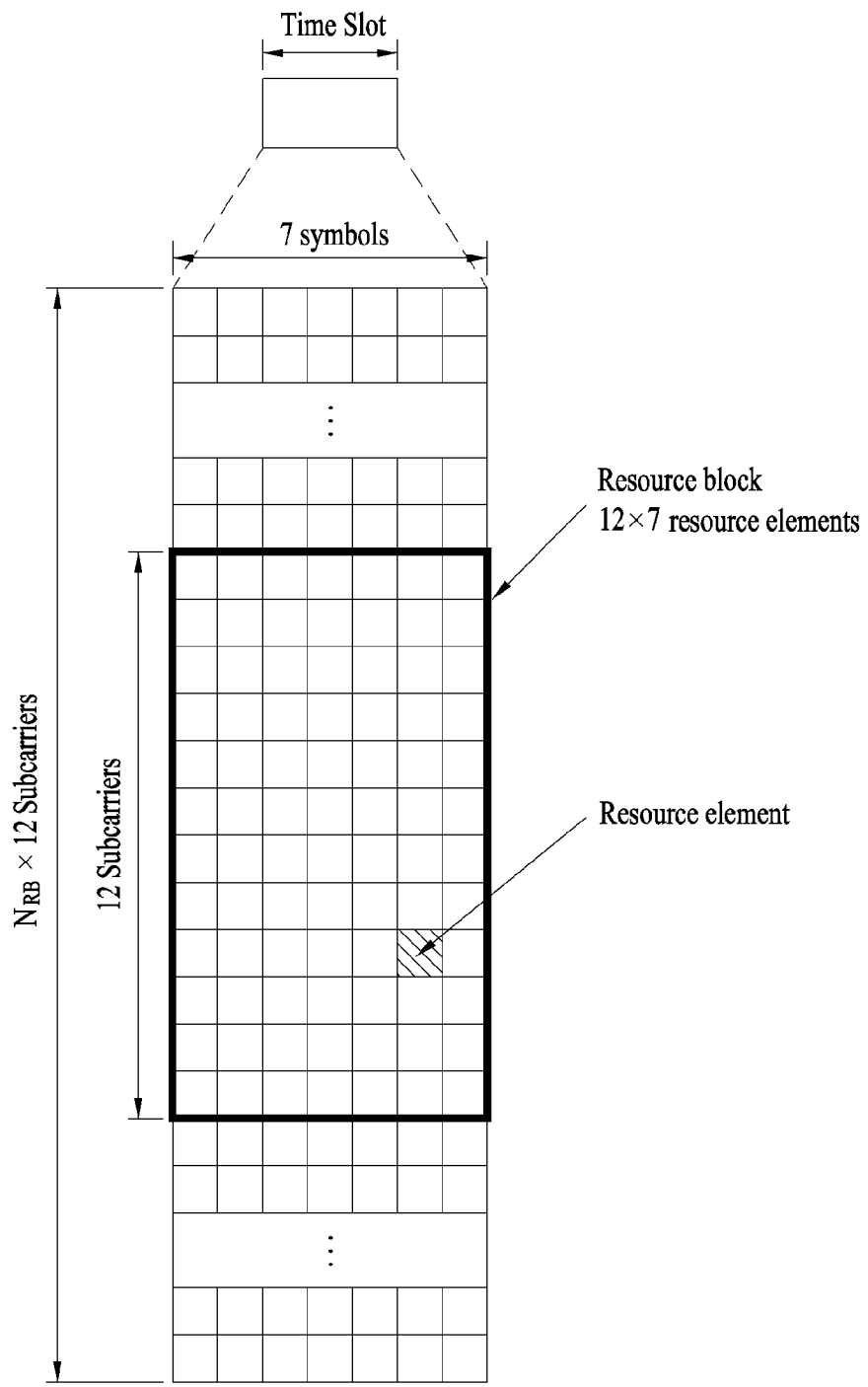
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain. However, the present invention is not limited thereto. Each element on the resource grid is referred to as a resource element (RE). One RB includes 12×7(6) REs. The number $N^{DL}$ of RBs included in the downlink slot depends on a downlink transmit bandwidth. The structure of an uplink slot may be same as that of the downlink slot.

Figure 4:
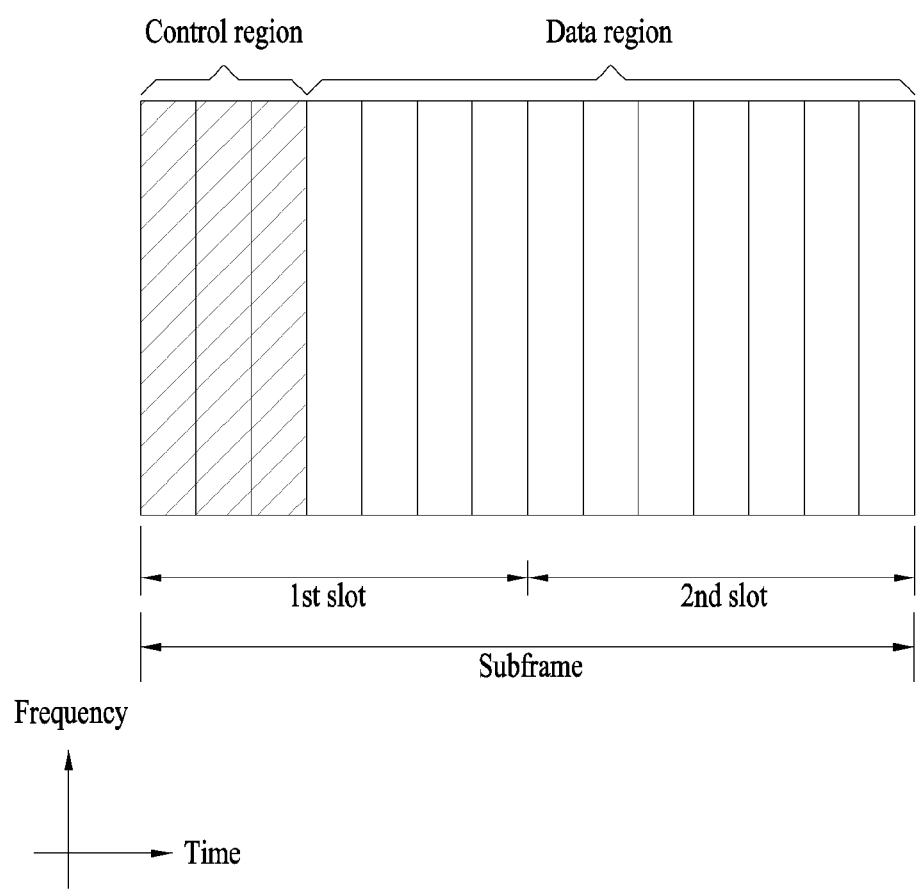
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UIE group.

Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary. A DCI format can be used to transmit control information of two or more types. For example, DCI format 0/1A is used to carry DCI format 0 or DCI format 1, which are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
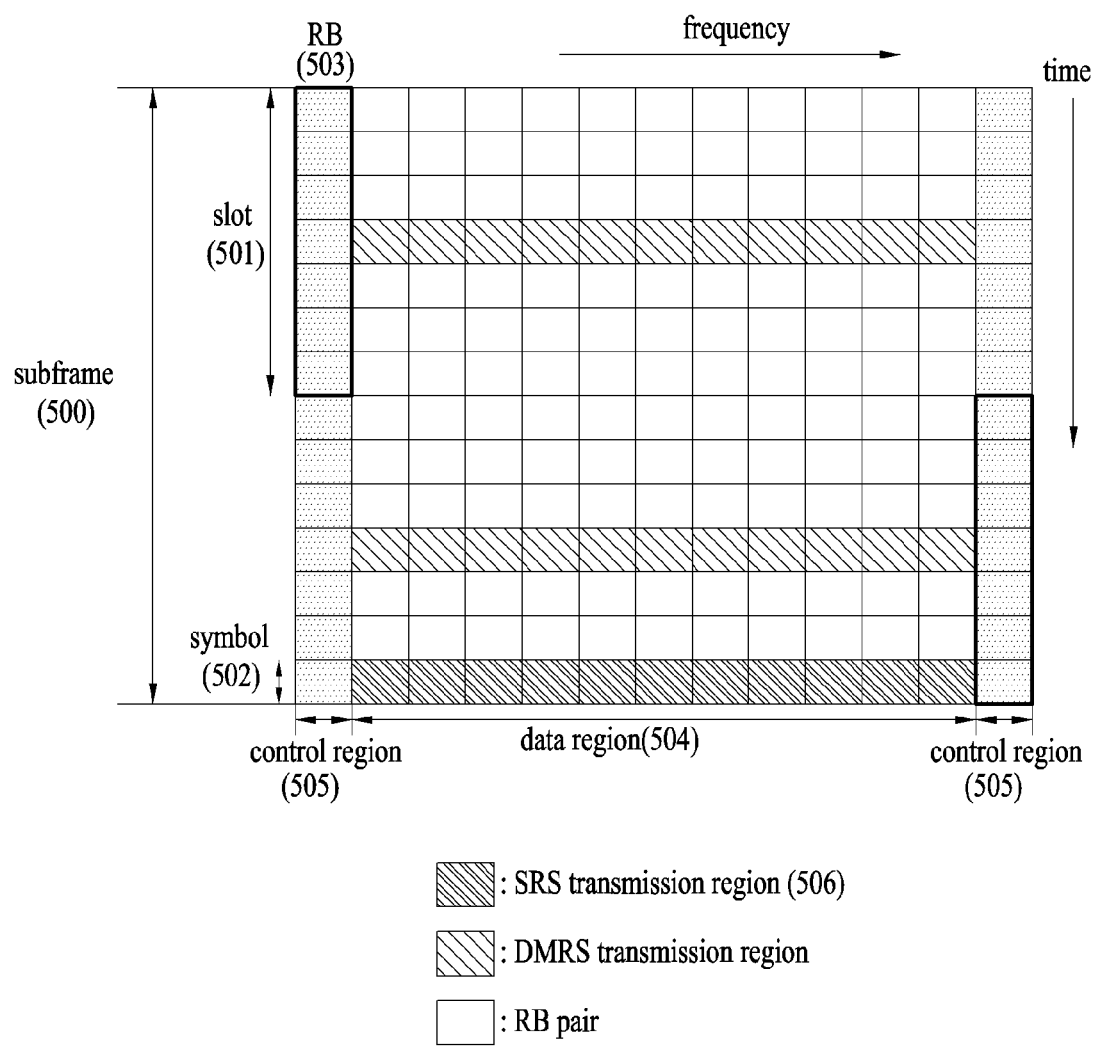
FIG. 5 illustrates an uplink subframe structure.

FIG. 5 illustrates an uplink subframe structure used in LTE.

Referring to FIG. 5, a subframe 500 includes two 0.5 ms slots 501. When a normal CP is used, each slot includes 7 symbols 502 each corresponding to an SC-FDMA symbol. A resource block 503 is a resource allocation unit corresponding to 12 subcarriers in the frequency domain and to a slot in the time domain. The uplink subframe is divided into a data region 504 and a control region 505. The data region refers to a communication resource used for a UE to transmit data such as audio data, packets, etc. and includes a PUSCH (physical uplink shared channel). The control region refers to a communication resource used for the UE to transmit uplink control information (UCI) and includes a PUCCH (physical uplink control channel).

The PUCCH can be used to transmit the following control information.

SR (scheduling request): This is information used to request a UL-SCH resource and is transmitted using On-Off Keying (OOK) scheme.

HARQ ACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ-ACK response includes positive ACK (simply, ACK), negative ACK (NACK), DTX or NACK/DTX. Here, HARQ-ACK is used interchangeably with HARQ ACK/NACK and ACK/NACK.

CSI (channel state information): This is feedback information about a downlink channel Feedback information regarding multiple input multiple output (MIMO) includes rank indicator (RI) and precoding matrix index (PMI). 20 bits are used for each subframe.

The quantity of control information that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 2 shows the mapping relationship between PUCCH formats and UCI in LTE(-A).

TABLE 2

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |

TABLE 2-continued

| PUCCH format | UCI (Uplink Control Information) |
|---|---|
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

An SRS is transmitted through the last SC-FDMA symbol of the subframe (506). SRSs of multiple UEs, transmitted through the same SC-FDMA symbol, can be discriminated according to frequency position/sequence. The SRS is transmitted aperiodically or periodically.

Figure 6:
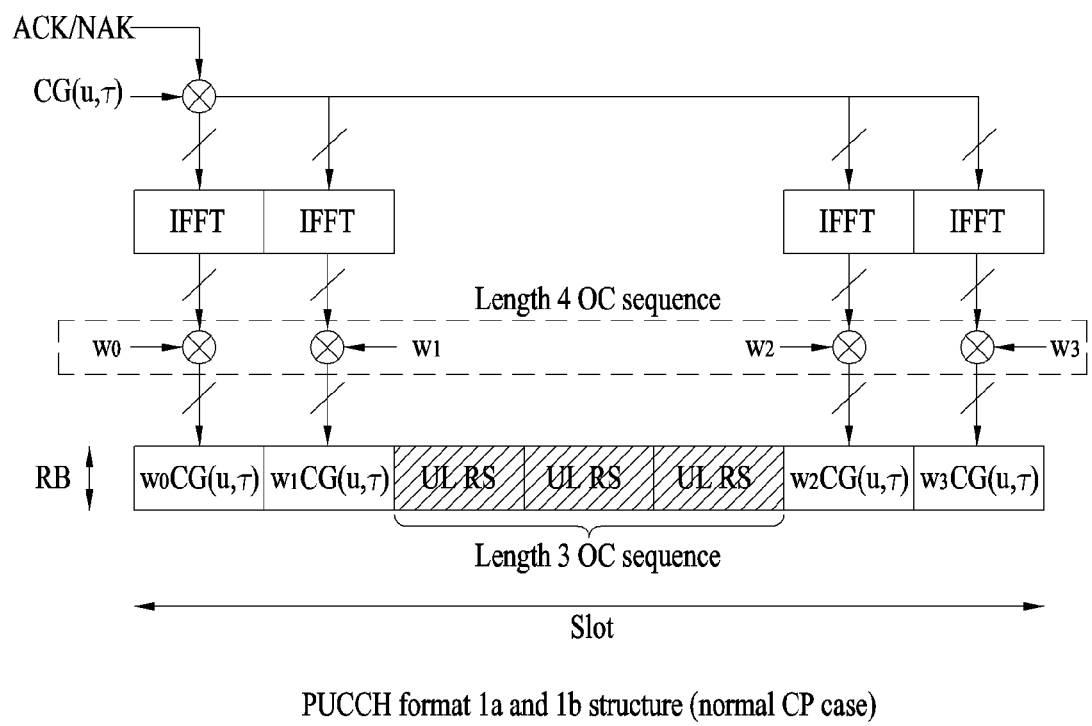
FIG. 6 illustrates a slot level structure of PUCCH format 1a/1b.

FIG. 6 illustrates a slot level structure of PUCCH formats 1a/1b. In the case of PUCCH formats 1a/1b, the same control information is repeated on a slot basis in a subframe. UEs transmit ACK/NACK signals through different resources configured of different cyclic shifts (CSs) (frequency domain codes) of a CG-CAZAC (computer-generated constant amplitude zero auto correlation) sequence and orthogonal covers or orthogonal cover codes (OCs or OCCs) (time domain spreading codes). The OC includes a Walsh/DFT orthogonal code, for example. When the number of CSs is 6 and the number of OCs is 3, 18 UEs can be multiplexed in the same PRB (physical resource block) on the basis of a single antenna.

Figure 7:
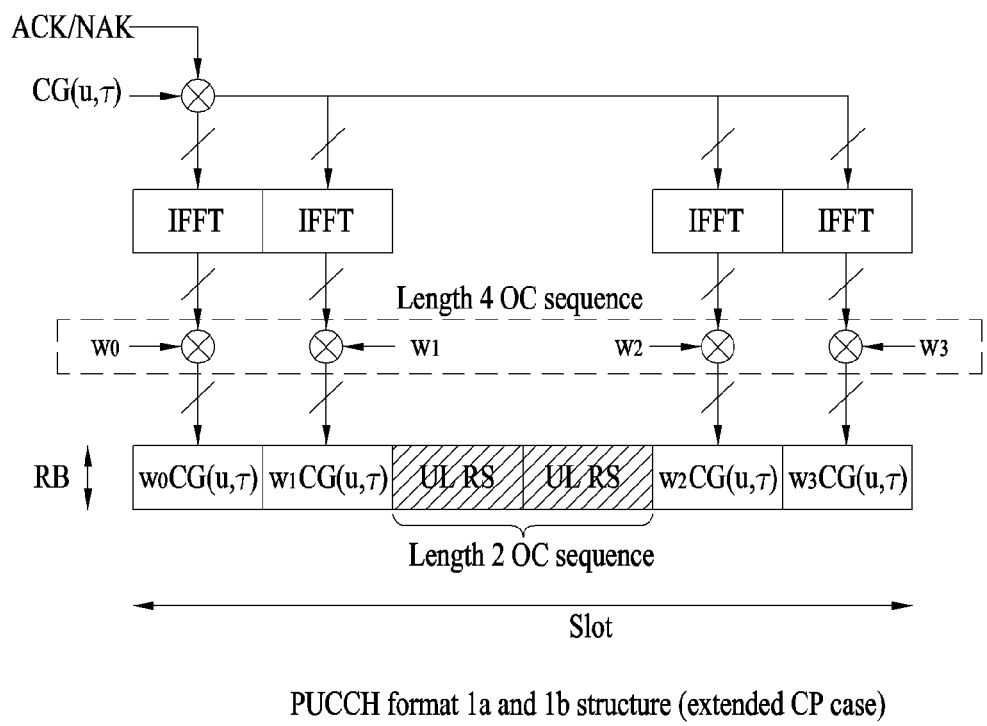
FIG. 7 illustrates a slot level structure of PUCCH format 2/2a/2b.

FIG. 7 illustrates a slot level structure of PUCCH formats 2/2a/2b. A subframe includes 10 QPSK data symbols in addition to a reference signal (RS). Each QPSK symbol is spread according to CS in the frequency domain and then mapped to a corresponding SC-FDMA symbol. The RS can be multiplexed according to CDM using a CS. For example, if the number of available CSs is 12 or 6, 12 or 6 UEs can be multiplexed in the same PRB.

Figure 8:
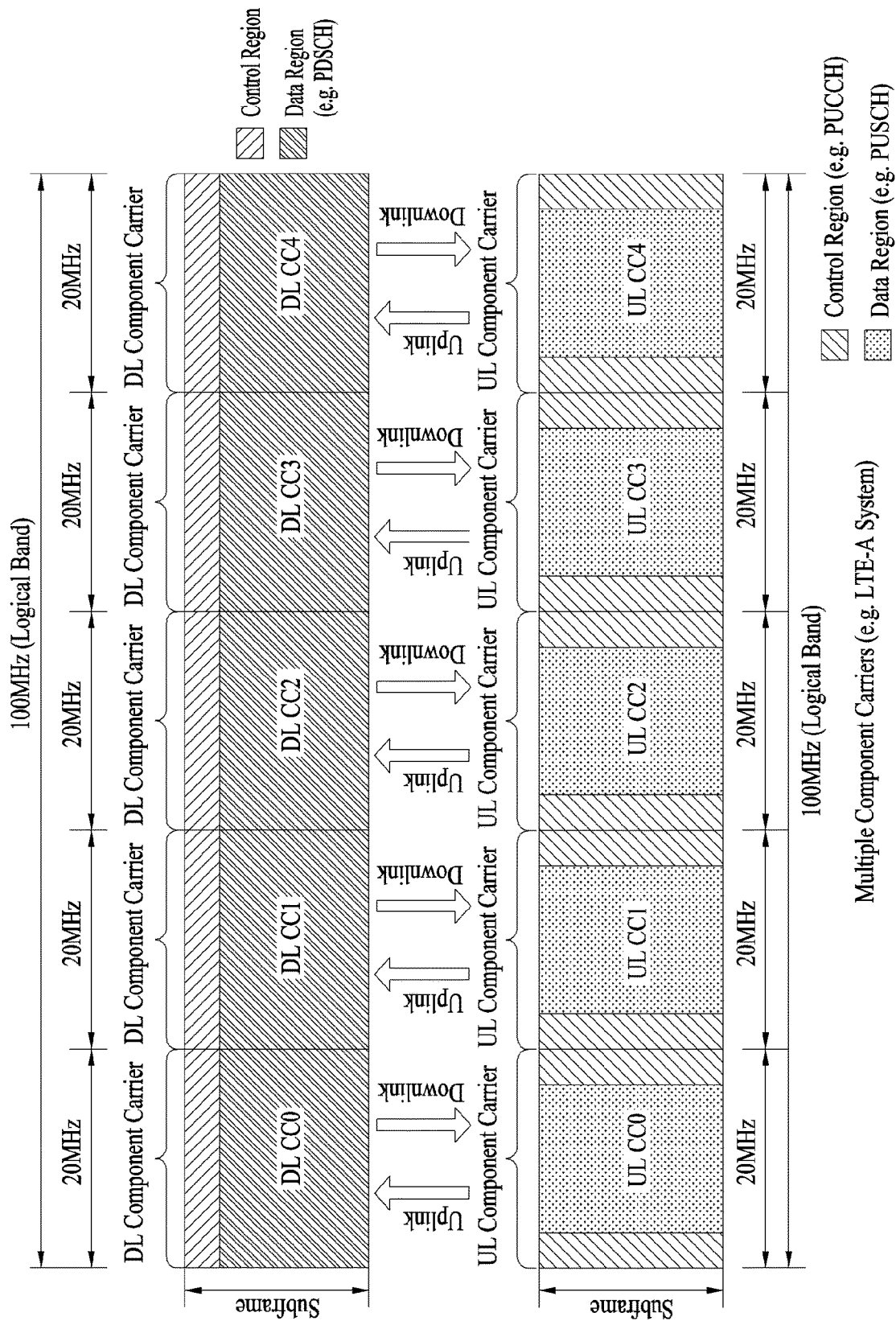
FIG. 8 illustrates a CA (carrier aggregation) communication system.

FIG. 8 illustrates a carrier aggregation (CA) communication system.

To support a wider uplink/downlink bandwidth, multiple UL/DL component carriers are aggregated. CCs may be contiguous or non-contiguous in the frequency domain. The bandwidth of each component carrier can be independently determined. Asymmetrical carrier aggregation in which the number of UL CCs is different from the number of DL CCs is possible. Control information may be transmitted and received through a specific CC only. The specific CC may be referred to as a primary CC and other CCs may be referred to as secondary CCs. For example, cross-carrier scheduling (or cross-CC scheduling) is applied, a PDCCH for downlink allocation can be transmitted through DL CC #0 and a PDSCH corresponding to the PDCCH can be transmitted through DL CC #2. The term "component carrier" can be replaced by equivalent terms (e.g. carrier, cell, etc.).

For cross-CC scheduling, a carrier indicator field (CIF) is used. Setting of presence or absence of a CIF in a PDCCH can be enabled through higher layer signaling (e.g. RRC signaling) semi-statically UE-specifically (or UE-group-specifically). PDCCH transmission can be arranged as follows.

CIF disabled: a PDCCH on a DL CC is used to allocate a PDSCH resource on the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.

LTE DCI format extended to have the CIF
CIF is a fixed x-bit field (e.g. x=3) (when the CIF is set).
CIF position is fixed irrespective of DCI format size (when the CIF is set).

When the CIF is present, a BS can allocate a monitoring DL CC (set) in order to reduce BD complexity in a UE. For PDSCH/PUSCH scheduling, the UE can detect/decode a PDCCH only in the corresponding DL CC. The BS can transmit the PDCCH through the monitoring DL CC (set) only. The monitoring DL CC set can be set UE-group-specifically or cell-specifically.

Figure 9:
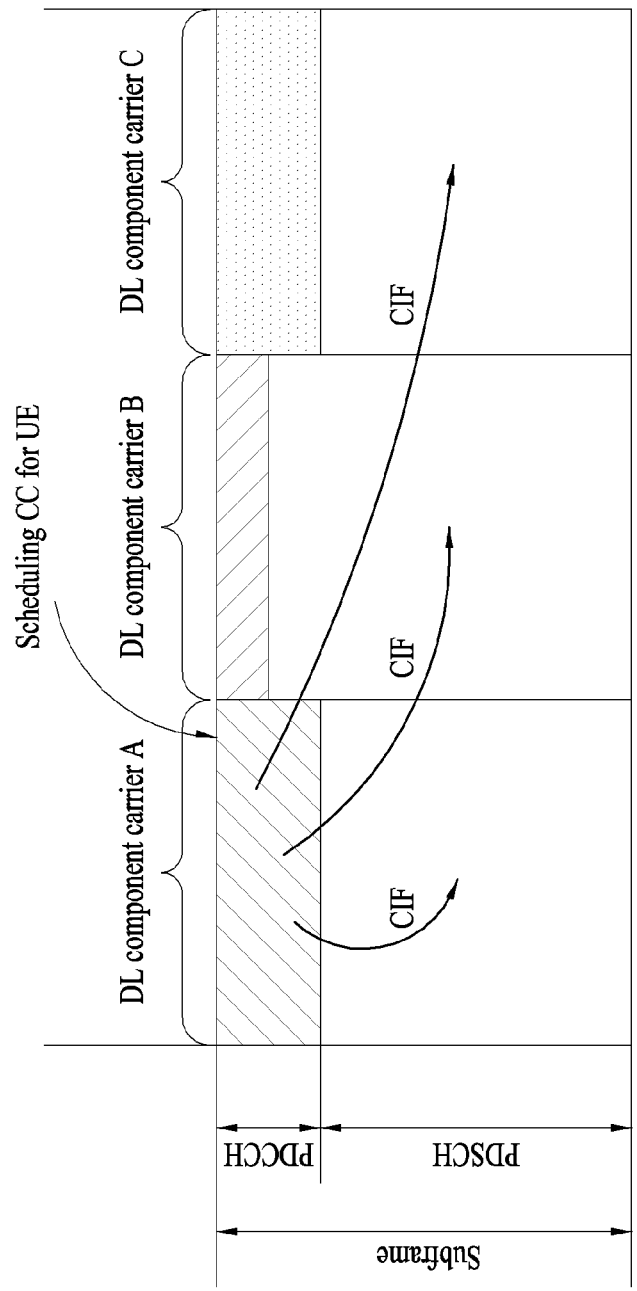
FIG. 9 illustrates cross-carrier scheduling.

FIG. 9 illustrates a case in which 3 DL CCs are aggregated and DL CC A is set as a monitoring DL CC. When the CIF is disabled, each DL CC can transmit a PDCCH that schedules a PDSCH of each DL CC without the CIF according to LTE PDCCH rules. When the CIF is enabled through higher layer signaling, only DL CC A can transmit PDCCHs that schedule PDSCHs of other DL CCs as well as the PDSCH thereof using the CIF. A PDCCH is not transmitted through DL CC B and DL CC C which are not set as a monitoring DL CC. Here, "monitoring DL CC (MCC)" can be replaced by equivalent terms such as a monitoring carrier, monitoring cell, scheduling carrier, scheduling cell, serving carrier, serving cell, etc. A PCC can be referred to as an MCC for scheduling. A DL CC through which a PDSCH corresponding to a PDCCH is transmitted and a UL CC through which a PUSCH corresponding to the PUCCH is transmitted can be referred to as scheduled carriers, scheduled cells, etc.

Embodiment: HD (Half-Duplex) Operation in CA

When a UE aggregates a plurality of cells, simultaneous transmission/reception is not allowed or is impossible in a plurality of the aggregated cells due to a gap between frequency bands to which each cell belongs thereto, a hardware configuration of the UE, an indication received from an eNB, or the like. In particular, if SFs (subframes) having a different transmission direction are collided with each other among a plurality of the aggregated cells at the same timing (hereinafter, overlap SF), it may put a priority on an SF or a specific transmission direction of a specific cell among a plurality of the aggregated cells to perform transmission and reception. For example, among a plurality of the aggregated cells, a cell having a transmission direction identical to the transmission direction of the specific cell can be managed only at the overlap SF (timing). For clarity, the abovementioned scheme is defined as an HD (half-duplex) operation.

As a representative example, when a plurality of TDD cells having a different UL-DL configuration (UD-cfg) are aggregated (CA), simultaneous transmission/reception can be restricted. In this case, a priority can be basically put on an SF (i.e., transmission direction) of a PCell. 1) If a DL SF of the PCell is collided with a UL SF (or S (special) SF) of an SCell, transmissions of all UL signals are restricted/omitted in the SCell. 2) If a UL SF of the PCell is collided with a DL SF of the SCell, receptions of all DL signals are restricted/omitted in the SCell. 3) If an S SF of the PCell is collided with a DL SF of the SCell, reception of PCFICH/PHICH/PDCCH signal is allowed on a legacy control channel in the SCell and reception of PDSCH/EPDCCH (enhanced PDCCH)/PMCH (physical multicast channel)/PRS (positioning reference signal) can be restricted/omitted in the SCell.

FIG. 10 illustrates a HD-TDD CA structure. In the figure, shaded parts X show a CC (link direction) that are restricted from being used in a collided SF. Referring to FIG. 10, when a PCC is set to a UL SF and an SCC is set to a DL SF, only the UL SF of the PCC is handled as operable and the DL SF of the SCC is not handled as operable. In particular, receptions of all DL signals are restricted/omitted in the SCell.

Meanwhile, if a priority is always put on a PCell SF in an overlap SF, a transmission/reception operation of a UE becomes relatively simple, whereas an SCell SF resource is always unavailable in the overlap SF. Hence it is very inefficient in the aspect of DL/UL traffic adaptation. For example, it may consider a status that UD-cfg (e.g., UL heavy UD-cfg) (DL SF<UL SF) is set to a PCell and UD-cfg (e.g., DL heavy UD-cfg) (DL SF>UL SF) is set to an SCell. In this case, DL throughput performance can be restricted due to SCell DL SF resource loss in the overlap SF. On the contrary, when the PCell has DL heavy UD-cfg and the SCell has UL heavy UD-cfg, UL throughput performance can be restricted due to SCell UL SF resource loss in the overlap SF.

In the following, in order to solve the abovementioned problem, the present invention proposes a method of configuring a (DL/UL) SF resource capable of supporting a transmission/reception operation of an HD-based UE more appropriate for DL/UL traffic adaptation when a plurality of cells are aggregated. Although the present invention is explained centering on a CA status among a plurality of cells having a different UD-cfg, the present invention can be applied to a case that an overlap SF is generated due to a different subframe pattern/configuration of each cell without any restriction. For example, the present invention can also be applied to a case that an FDD cell and a TDD cell are aggregated.

Specifically, the present invention proposes that an eNB periodically informs a UE of a specific subframe pattern/configuration corresponding to a reference for configuring an SF resource (i.e., a transmission direction) (hereinafter, reference subframe pattern/configuration). Information on the reference subframe pattern/configuration can be periodically indicated using L1 (layer 1) signaling (e.g., PDCCH). In particular, a UE regards a DL/UL SF of the reference subframe pattern/configuration as a transmission direction prioritized in a corresponding (overlap) SF. The UE can perform a transmission/reception operation (e.g., a signal processing operation for transmission/reception) (e.g., coding/decoding, modulation/demodulation, resource mapping, etc.) using an SF resource having a transmission direction matched with the transmission direction of the DL/UL SF of the reference subframe pattern/configuration only among DL/UL SFs of all cells. In this case, the reference subframe pattern/configuration can configure a transmission direction to be matched with an aligned SF in all aligned SFs. In this case, an aligned DL/UL SF corresponds to an SF of which a transmission direction (DL/UL) is matched in all aggregated cells. The reference subframe pattern/configuration can be signaled using a UL-DL configuration (hereinafter, UD-cfg) (refer to Table 1). UD-cfg indicating the reference subframe patter/configuration is referred to as a reference UD-cfg (hereinafter, R-cfg). In particular, UD-cfg capable of being configured/indicated by the R-cfg can be selected/determined from among only a UD-cfg set including a DL/UL configuration of which a transmission direction is matched with an aligned SF in all aligned SFs. Hence, it may be able to define/configure L1 signaling (e.g., PDCCH) for indicating the reference subframe pattern/configuration (e.g., R-cfg) to be transmitted/detected from among (all or a part of) aligned DL SFs.

Meanwhile, in case of UD-cfg (hereinafter, D-ref) corresponding to a reference for PDSCH-related DL HARQ timing, the UD-cfg can be determined/configured from among UD-cfg (e.g., least DL number) configured as DL (i.e., including DL union) for all SFs of which at least one cell is configured as DL. In this case, the DL can include a DL SF and an S SF. Hence, the DL HARQ (e.g., DL grant, PDSCH, HARQ-ACK) timing defined in the D-ref can be determined/applied as PDSCH-related HARQ timing in all cells. Similarly, in case of UD-cfg (hereinafter, U-ref) corresponding to a reference for PUSCH-related UL HARQ timing, the UD-cfg can be determined/configured from among UD-cfg (e.g., least UL number) configured as UL (i.e., including UL union) for all SFs of which at least one cell is configured as UL. In this case, the DL can include a DL SF and an S SF. Hence, the UL HARQ (e.g., UL grant, PUSCH, PHICH) timing defined in the U-ref can be determined/applied as PUSCH-related HARQ timing in all cells.

Meanwhile, if a UE fails to detect R-cfg due to such a specific reason as interference, channel change, or the like or detects invalid/inconsistent R-cfg (hereinafter, fallback case), the UE may operate as follows.

Alt 1) The UE performs a transmission/reception operation in an aligned DL/UL SF only.

Alt 2) In addition to the Alt 1, the UE uses a UL SF only by putting a priority on UL for an overlap SF (i.e., R-cfg is regarded as the U-ref).

Alt 3) The UE uses an SF matched with a PCell only by putting a priority on a transmission direction of an SF of the PCell (i.e., R-cfg is regarded as UD-cfg of the PCell).

In this case, if the invalid/inconsistent R-cfg is detected, it means that UD-cfg configured/indicated by the R-cfg includes a DL/UL configuration of which a transmission direction is not matched with an aligned SF in the aligned SF. Or, it means that R-cfgs are not matched with each other when R-cfg is signaled several times within a period (e.g., 40 ms) for which the R-cfg is maintained. For example, when it is assumed that R-cfgs, which are received in a radio frame in an SFN satisfying 'SFN (Super Frame Number)=P*m+i+B', are identical to each other, if unmatched R-cfg(s) is detected in a radio frame in an SFN satisfying 'SFN (Super Frame Number)=P*m+i+B', it is regarded as an invalid/inconsistent R-cfg is detected. In this case, the SFN denotes a radio frame number, the P corresponds to a positive integer (e.g., 4) indicating a radio frame interval for which R-cfg is maintained, the m corresponds to an integer equal to or greater than 0, I=0, 1, . . . , P−1, and the B is a constant number corresponding o an offset. The B corresponds to an integer (0~P−1) (e.g., 0).

Figures 13, 14:
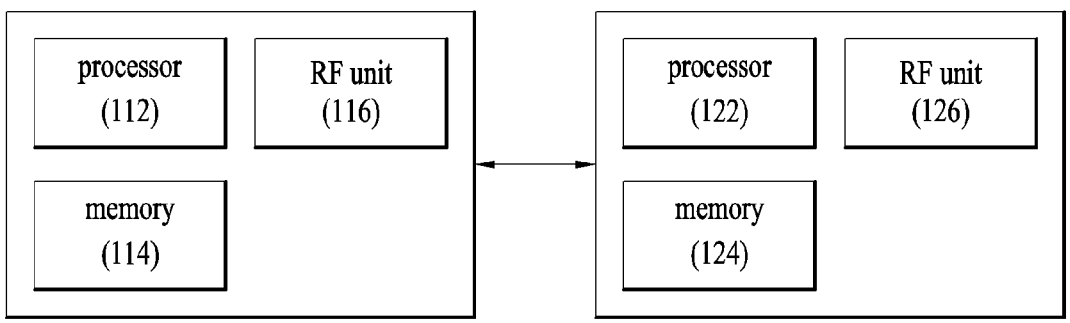

FIGS. 11 to 13 illustrate an SF resource configuration per cell and UE operation according to the present invention.

Referring to FIG. 11, it may assume that a PCell and an SCell operate as UD-cfg #1 and UD-cfg #3, respectively, when 2 cells are aggregated with each other (CA). In this case, R-cfg can be configured/indicated by one selected from the group consisting of UD-cfgs #1, #3, #4, and #6. The UD-cfg of the PCell and the UD-cfg of the SCell can be configured using system information. In the UD #1 and the UD-cfg #3, an aligned DL/UL SF corresponds to SFs #0-3/#5/#9 (hatching part) and a transmission direction of UD-cfg #1/3/4/6 is identical to a transmission direction of UD-#1/#3 in the SFs #0-3/#5/#9. Hence, an eNB selects one from among the UD-cfg #1/3/4/6 and configures the selected UD-cfg as R-cfg. Then, the eNB can periodically inform a UE of information indicating the R-cfg. The eNB can forward the information indicating the R-cfg to the UE using L1 signaling (e.g., PDCCH). The UE can perform a transmission/reception operation (e.g., signal processing operation for transmission/reception) on a cell of which a transmission direction is matched with the R-cfg only in a non-aligned DL/UL SF (i.e., SF #4/#6-8).

FIG. 12 illustrates SF resources of a PCell and a SCell when R-cfg is indicated by UD-cfg #4 under the condition of FIG. 11. Referring to FIG. 12, the SF resources of the PCell and the SCell can be configured in non-aligned DL/UL SFs (i.e., SFs #4/#6-8). In particular, a UE can perform an HD operation (e.g., a signal processing operation for transmission/reception) by putting a priority on a transmission direction of R-cfg for the non-aligned DL/UL SFs (i.e., SFs #4/#6-8). In FIG. 12, a box represented by a thick line corresponds to an SF in which (all or a part of) transmission/reception is restricted/omitted. N corresponds to no TX (transmission)/RX (reception) SF, i.e., an SF incapable of being used as a DL/UL resource. S(d) corresponds to an S SF capable of performing DL reception (e.g., via D2PTS) and the S SF incapable of performing UL transmission (e.g., via UpPTS). In some cases, all DL receptions can be restricted/omitted in the S SF. The DL reception (via DwPTS) includes PCFICH/PHICH/PDCCH signal.

The present invention can be comprehended as a PCell is replaced with R-cfg in a legacy HD operation. The present invention can be generalized as follows. When a priority is put on an SF (i.e., transmission direction) of R-cfg for an SF # k, 1) if a DL SF of the R-cfg is collided with a UL SF or an S (special) SF of an xcell, all UL signal transmissions are restricted/omitted in the xcell (in some cases, DL reception can be performed via D2PTS), 2) if a UL SF of the R-cfg is collided with a DL SF of the xcell, all DL signal receptions are restricted/omitted in the xcell, 3) if an S SF of the R-cfg is collided with the DL SF of the xcell, a legacy control channel such as PCFICH/PHICH/PDCCH signal is received only in the xcell and reception of PDSCH/EPDCCH/PMCH/PRS signal can be restricted/omitted in the xcell. In this case, a transmission direction of the xcell is different from a transmission direction of the R-cfg in the SF # k. If a cell has a transmission direction identical to the transmission direction of the R-cfg in the SF # k, a transmission/reception operation (e.g., a signal processing operation for transmission/reception) can be normally performed in the cell.

In case of UD-cfg corresponding to a reference for HARQ timing under the condition of FIG. 11, UD-cfg #4 or #5 (i.e., UD-cfg #4 including least DL number) including all DL unions of a PCell and an SCell is determined/configured as D-ref commonly applied to the two cells and UD-cfg #0 or #6 (i.e., UD-cfg #6 including least UL number) including all UL unions of the PCell and the SCell can be determined/configured as U-ref commonly applied to the two cells.

FIG. 13 illustrates a method of configuring SF resources of a PCell and an SCell when a fallback case occurs under the condition of FIG. 11. Referring to FIG. 13, a UE performs a transmission/reception operation in an aligned DL/UL SF only in the PCell/SCell (Alt 1), in addition to the Alt 1, the UE uses a UL SF only by putting a priority on UL for an overlap SF (i.e., R-cfg is regarded as the U-ref) (Alt 2), and the UE uses an SF matched with a PCell only by putting a priority on a transmission direction of an SF of the PCell (i.e., R-cfg is regarded as UD-cfg of the PCell) (Alt 3). In FIG. 13, a box represented by a thick line corresponds to an SF in which (all or a part of) transmission/reception is restricted/omitted. N corresponds to no TX/RX SF, i.e., an SF incapable of being used as a DL/UL resource. S(u) corresponds to an S SF capable of performing UL transmission (e.g., via UpPTS) and the S SF incapable of performing DL reception (e.g., via DwPTS). In some cases, all UL transmissions can be restricted/omitted in the S SF.

Meanwhile, it may consider a method of configuring each of an aligned SF and an overlap SF as an SF set to which independent DL CSI measurement/report and/or an independent UL power control procedure are applied. In case of the DL CSI measurement/report, an independent periodic CSI process (e.g., CSI content type, report timing/period) can be set to the aligned DL SF and the overlap SF, respectively. A (PUSCH-based) aperiodic CSI request can indicate a CSI measurement target SF among the aligned DL SF and the overlap SF via a corresponding UL grant DCI. And, a UL power control (PC) procedure can set an independent open-loop PC parameter (e.g., PO_PUSCH,c(j) related parameter and/or ac(j)) to the aligned UL SF and the overlap SF, respectively. And, a TPC (transmit power control) command (e.g., $\delta_{PUSCH,c}$) can also be accumulated to the aligned UL SF and the overlap SF, respectively.

The method of the present invention is not restricted to CA between TDD cells or CA between two cells. The method can be identically/similarly applied to CA between cells operating based on a different duplexing scheme or a different frame structure (CA between a TDD cell and an FDD cell and CA between a cell on a licensed band and a cell on an unlicensed band) and CA among 3 or more cells.

FIG. 14 illustrates a BS, a relay and a UE applicable to the present invention.

Referring to FIG. 14, a wireless communication system includes a BS 110 and a UE 120. When the wireless communication system includes a relay, the BS or UE can be replaced by the relay.

The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other devices of a wireless mobile communication system. Specifically, the present invention is applicable to a method for transmitting uplink control information and an apparatus for the same.

What is claimed is:

1. A method of performing communication by a user equipment (UE) in a time division duplex (TDD)-based wireless communication system, the method comprising:
configuring a first UL-DL configuration for a primary cell (PCell) and a second UL-DL configuration for a secondary cell (SCell), wherein the first and the second UL-DL configurations are different;
receiving information on a reference UL-DL configuration; and
performing a signal processing operation in a subframe # k1 or a subframe # k2,
wherein a subframe configuration of the subframe # k1 based on the first UL-DL configuration is different from a subframe configuration of the subframe # k1 based on the second UL-DL configuration,
wherein a subframe configuration of the subframe # k2 based on the first UL-DL configuration is the same as a subframe configuration of the subframe # k2 based on the second UL-DL configuration, wherein when the subframe # k1 is used, the signal processing operation is performed in one cell having the same subframe configuration as the reference UL-DL configuration, for the subframe # k1, wherein when the subframe # k2 is used, the signal processing operation is performed for the PCell and the SCell, and wherein configurations related to Channel State Information (CSI) process and configurations related to power control are independently configured for each of the subframe # k1 and the subframe # k2.

2. The method of claim 1, wherein a subframe configuration for each of the reference UL-DL configuration, the first UL-DL configuration and the second UL-DL configuration is given by the following table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, U denotes an uplink subframe, and S denotes a special subframe.

3. The method of claim 2, wherein the subframe configuration for the reference UL-DL configuration is identical to the subframe configurations of the PCell and the SCell in all subframes where the subframe configuration of the PCell is identical to the subframe configuration of the SCell.

4. The method of claim 2, wherein the reference UL-DL configuration is different from the first UL-DL configuration.

5. The method of claim 1, wherein information on the first UL-DL configuration and the second UL-DL configuration is received via system information, and the information on the reference UL-DL configuration is received via a physical downlink control channel (PDCCH).

6. A user equipment (UE) in a time division duplex (TDD)-based wireless communication system, comprising:
a transmitter and a receiver; and
at least one processor,
wherein the at least one processor configured to:
configure a first UL-DL configuration for a primary cell (PCell) and a second UL-DL configuration for a secondary cell (SCell), wherein the first and the second UL-DL configurations are different,
receive information on a reference UL-DL configuration, and
perform a signal processing operation in a subframe # k1 or a subframe # k2, wherein a subframe configuration of the subframe # k1 based on the first UL-DL configuration is different from a subframe configuration of the subframe # k1 based on the second UL-DL configuration, wherein a subframe configuration of the subframe # k2 based on the first UL-DL configuration is the same as a subframe configuration of the subframe # k2 based on the second UL-DL configuration, wherein when the subframe # k1 is used, the signal processing operation is performed in one cell having the same subframe configuration as the reference UL-DL configuration, for the subframe # k1, wherein when the subframe # k2 is used, the signal processing operation is performed for the PCell and the SCell, and wherein configurations related to Channel State Information (CSI) process and configurations related to power control are independently configured for each of the subframe # k1 and the subframe # k2.

7. The UE of claim 6, wherein a subframe configuration for each of the reference UL-DL configuration, the first UL-DL configuration and the second UL-DL configuration is given by the following table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, U denotes an uplink subframe, and S denotes a special subframe.

8. The UE of claim 7, wherein the subframe configuration for the reference UL-DL configuration is identical to the subframe configurations of the PCell and the SCell in all subframes where the subframe configuration of the PCell is identical to the subframe configuration of the SCell.

9. The UE of claim 7, wherein the reference UL-DL configuration is different from the first UL-DL configuration.

10. The UE of claim 6, wherein information on the first UL-DL configuration and the second UL-DL configuration is received via system information and wherein the information on the reference UL-DL configuration is received via a physical downlink control channel (PDCCH).

* * * * *